Sept. 24, 1957     H. E. GRAHAM     2,807,120
APPARATUS FOR PROTECTING AGRICULTURAL CROPS FROM FROST
Filed Oct. 7, 1955     2 Sheets-Sheet 1
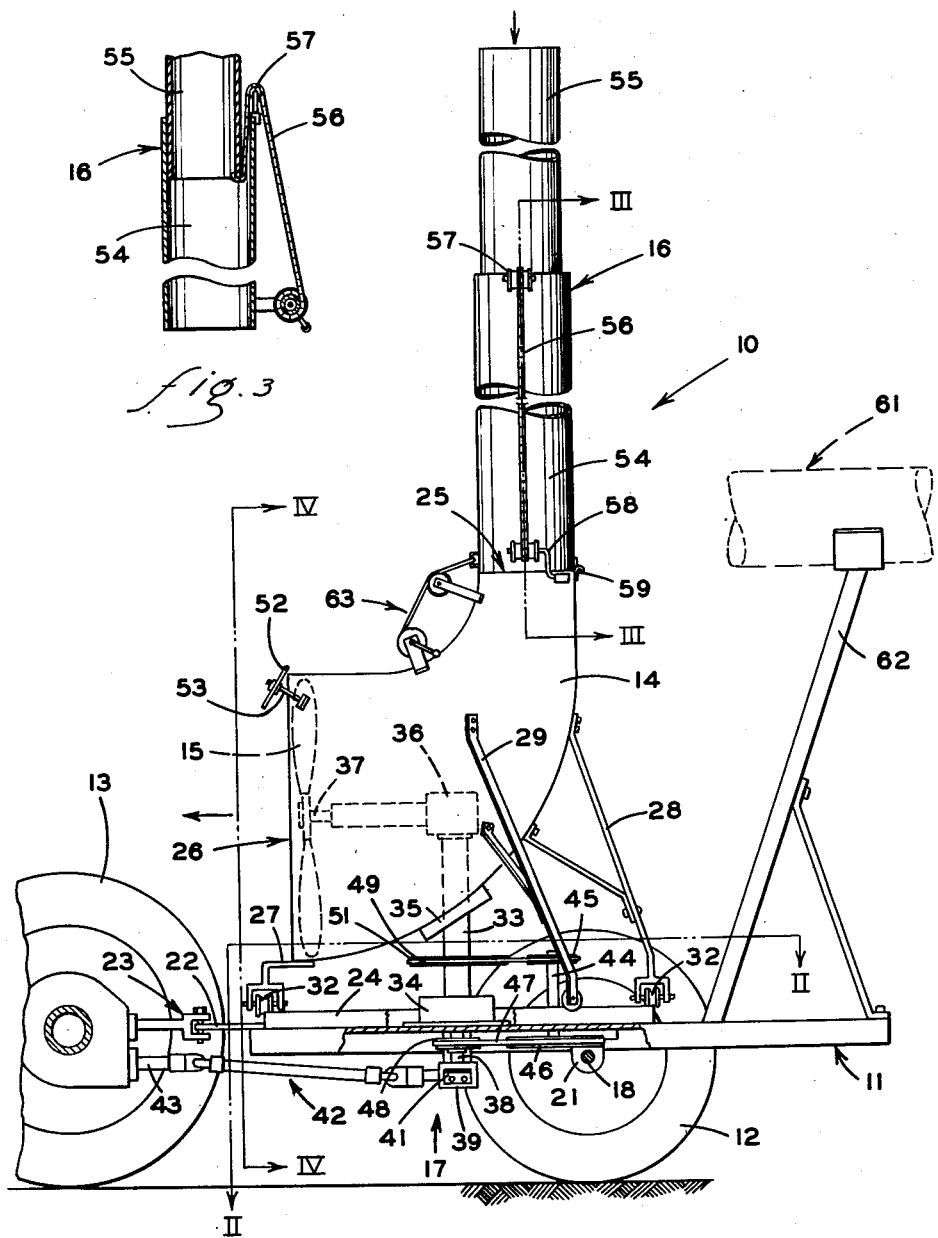
fig. 3
fig. 1
INVENTOR.
HERBERT E. GRAHAM
BY
ATTORNEY Sept. 24, 1957     H. E. GRAHAM     2,807,120
APPARATUS FOR PROTECTING AGRICULTURAL CROPS FROM FROST
Filed Oct. 7, 1955     2 Sheets-Sheet 2
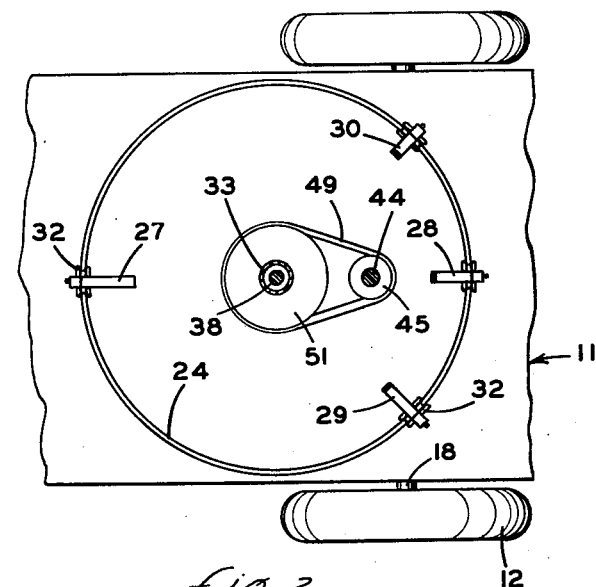
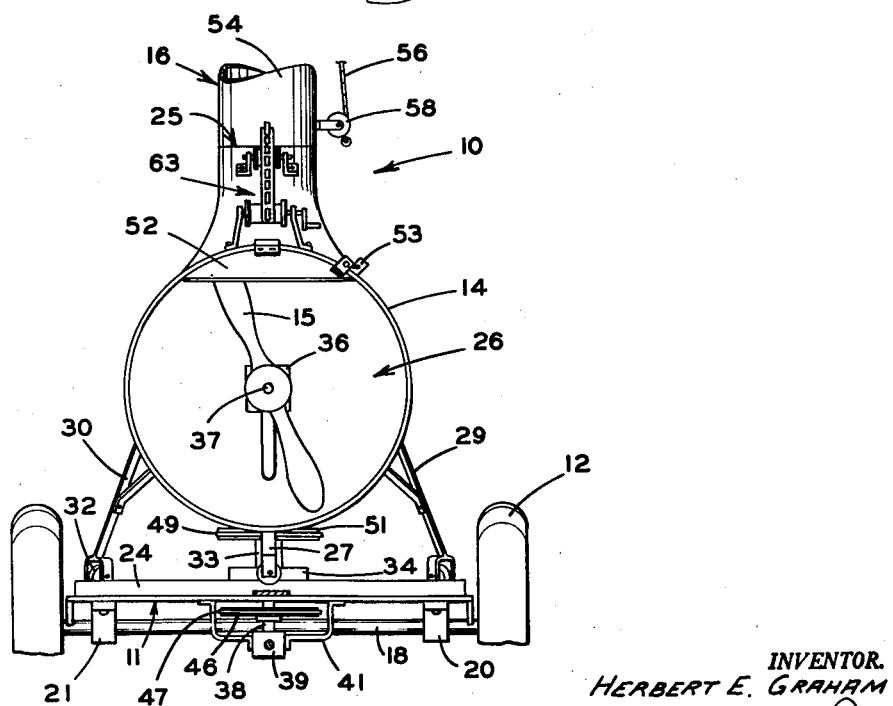
INVENTOR.
HERBERT E. GRAHAM
BY
ATTORNEY

United States Patent Office 2,807,120
Patented Sept. 24, 1957

2,807,120

APPARATUS FOR PROTECTING AGRICULTURAL CROPS FROM FROST

Herbert E. Graham, Saugatuck, Mich., assignor to C & H Machine Company, Saugatuck, Mich., a partnership Application October 7, 1955, Serial No. 539,123

4 Claims. (Cl. 47—2)

This invention relates in general to a portable apparatus for protecting agricultural crops against injury by an inversion-type frost and, more particularly, to a type of said apparatus whereby air from a relatively warm layer, spaced above the ground during a temperature inversion, may be drawn downwardly and discharged adjacent to the ground where the air is relatively colder.

Persons familiar with the raising of agricultural crops have long recognized the need for a portable apparatus for dispelling, or preventing the formation of, layers of injuriously cold air adjacent to the ground during a temperature inversion. Present mechanisms designed for this purpose, such as heating units and the like, have not proven completely satisfactory for a variety of reasons. As a rule, said present mechanisms are not portable, are inadequate in capacity or, in order to be effective at all, are so large and cumbersome that the warm air must be discharged in a substantially fixed direction after the mechanism is set into operation, which greatly limits its area of effectiveness. Furthermore, where a heating device of some type is used, the output of warm air is limited by the heat output of the heating unit, and such heat output is considerably limited by cost considerations. In order to provide a unit which would properly heat the large volumes of air that presently existing devices are capable of moving, the cost would be prohibitive to the majority of the very users who need this type of equipment most.

Accordingly, a primary object of this invention is the provision of a portable apparatus for dispelling, or preventing the formation of, a relatively cold and injurious layer of air adjacent to the ground, especially during a temperature inversion, which apparatus will have access to an unlimited supply of relatively warm air, which apparatus can be placed in the center of the area from which said layer of cold air must be displaced, and which apparatus will then be able to move said warmer air radially in all horizontal directions.

A further object of this invention is the provision of an apparatus, as aforesaid, which can be connected to, and easily moved by, any conventional vehicle, such as a tractor, which apparatus can be operated from any convenient means, such as the power take-off of said tractor, and which apparatus can be easily operated by any person capable of operating said tractor.

A further object of this invention is the provision of a portable apparatus, as aforesaid, which is far more effective in protecting agricultural crops against injury by said frost than any mechanism presently in existence for the same purpose, and which, by comparison, is less expensive to fabricate and operate than said present mechanisms.

Other objects and purposes of this invention will become apparent to persons familiar with this type of equipment upon reading the following specification and examining the drawings, in which:

Figure 1 is a broken, side elevation view of the apparatus to which this invention relates.

Figure 2 is a sectional view substantially as taken along the line II—II of Figure 1.

Figure 3 is a sectional view taken along the line III—III of Figure 1.

Figure 4 is a sectional view taken along the line IV—IV of Figure 1.

For the purpose of convenience in description, the terms "upper," "lower," and derivatives thereof, will have reference to the apparatus as appearing in Figure 1. The terms "front" and "rear" will have reference to the left and right ends, respectively, of the apparatus as appearing in Figure 1. The terms "inner," "outer," and derivatives thereof, will have reference to the geometric center of said apparatus and parts thereof.

*General description*

In order to meet the objects and purposes set forth above, as well as others related thereto, I have provided a portable apparatus 10 comprised of a base frame 11, which has wheels 12 and which may be hitched, in a substantially conventional manner, to the rear end of a vehicle, such as the tractor 13. A curved fan housing 14, which has a circular cross-section of increasing diameter from its inlet end to its discharge end, is mounted upon the frame 11 for rotation about a vertical axis. An axial flow fan 15 is rotatably mounted within the discharge end of the fan housing 14 for a horizontal discharge. The inlet end of said fan housing is connectible to an extendable duct system 16 when said duct system is in the vertical position. Drive mechanism 17 is provided for rotating the fan 15 and may be actuated by any convenient means, such as the power take-off of the tractor 13. The housing is rotated by means operated from said drive mechanism 17.

*Detailed construction*

As shown in Figures 1, 2 and 4, the base frame 11 is a substantially flat and rectangular platform, which may be fabricated from any conventional material, such as wood or metal. An axle 18 is rotatably mounted upon and beneath the frame 11 by a pair of bearings 20 and 21 (Figure 4) secured to said frame. A pair of wheels 12 are secured to the opposite ends of, and are rotatable with, the axle 18 in a conventional manner. The frame 11 has a tongue 22 engageable with the hitch 23 of a vehicle, such as the tractor 13, in a conventional manner. A circular track 24 is mounted upon the upper surface of the frame 11 with its axis perpendicular to said surface.

The fan housing 14 has the shape of a curved pipe, preferably of circular cross-section, having an inlet opening 25 at one end thereof and a discharge opening 26 at the other end thereof, the diameter of said pipe increasing substantially steadily from said inlet opening to said discharge opening. A front support leg, a rear support leg, and two side support legs, 27, 28, 29 and 30, respectively, are secured to the housing 14 and extend downwardly therefrom when the axis of the discharge opening 26 is horizontally disposed and said inlet opening 25 faces upwardly. A plurality of rollers 23, here four rollers, are rotatably mounted upon the lower ends of the legs 27, 28, 29 and 30, respectively, and the axes of said rollers are disposed substantially within a single plane. The peripheries of said rollers 32 simultaneously engage the upper edge of the track 24 and thereby support the housing 14 for rotation about the vertical axis of said track, which axis is parallel with the axis of the inlet opening 25 and preferably substantially perpendicular to the axis of the discharge opening 26. The track 24, the rollers 32, the legs 27, 28, 29 and 30, and the housing 14 are all preferably, but not necessarily, fabricated from metal.

A tubular shaft housing 33 (Figures 1 and 2), which is concentric with the rotational axis of the fan housing 14 and extends upwardly through the lower side thereof, is rotatably supported at its lower end by means of the housing bearing 34 (Figures 1 and 2), which is secured upon the upper surface of the frame 11. The shaft housing 33, which is part of the drive mechanism 17, is secured to the fan housing 14, where it extends therethrough, by any convenient means, such as the collar 35. An upper gear box 36 is mounted upon the upper end of the shaft housing 33 within the fan housing 14, and provides for the driving of the fan shaft 37 from a drive shaft 38, said drive shaft 38 being disposed within the shaft housing 33. The fan shaft 37, which is co-axial with the axis of the discharge opening 26, mounts the axial flow fan 15 on the end thereof adjacent to said discharge opening 26. The drive shaft 38 extends through and below the frame 11 by means, such as the bracket 41. The gear box 39 connects the drive shaft 38 to linkage 42 driven by the power shaft 43 of the tractor 13, for example.

The axial flow fan 15 may be of any conventional type, including an aircraft propeller which may be equipped with a variable pitch mechanism.

A countershaft 44 (Figures 1 and 4) is rotatably supported upon the frame 11, parallel with the drive shaft 38 and rearwardly thereof. Said countershaft 44 extends above the base frame 11 where it mounts a relatively small pulley 45, and extends below the base frame 11, where it mounts a relatively large pulley 46. Said large pulley 46 is engaged by a belt 47 which is driven from a relatively small pulley 48 mounted upon the drive shaft 38 below the frame 11. The small pulley 45 on the upper end of said countershaft 44 is engaged by a belt 49 which engages a relatively large pulley 51 mounted upon, and rotatable with, the shaft housing 33 above the frame 11. Thus, when the drive shaft 38 is rotated, the pulleys 45, 46, 48 and 51, acting through the belts 47 and 49, effect a rotation of the shaft housing 33 in the same rotational direction as the rotation of the drive shaft 38, but at considerably slower speed.

The discharge opening 26 on the fan housing 14 is provided near its upper edge with an air deflector 52, which is hinged upon said housing and provided with an adjustment device 53 for positioning said deflector 52 in a substantially conventional manner as desired.

The duct system 16 (Figures 1, 3 and 4) includes, in this particular embodiment, a lower duct 54 and an upper duct 55, said upper duct being coaxial with, and slidably receivable into, said lower duct 54. Such axial movement of the upper duct 55 is effected by means of a chain 56, which is secured to the lower end of the upper duct 55, extends over a pulley 56 located at the upper end of the lower duct 54, and thence extends downwardly where it is engaged by the shaft of the crank 58. The lower duct 54 is secured, as by means of the hinge 59, upon the fan housing 14 and said lower duct communicates at its lower end with the inlet opening 25 on said fan housing 14 when said lower duct 54 is in the vertical position, as shown in Figures 1 and 4. The hinge 59 permits pivotal movement of the duct system 16 out of its vertical position into a substantially horizontal position, such as that indicated by broken lines at 61 in Figure 1. The duct system 16 is supported in said broken line position 61 by the duct support 62, which is mounted upon the base frame 11 rearwardly of the track 24. Means such as the pulley and crank arrangement 63 (Figures 1 and 4), may be provided for assisting in the movement of the duct system 16 between its vertical and horizontal positions.

*Operation*

As indicated in the above description, the apparatus 10 may be moved to the situs of its operation by hitching same to a suitable vehicle, such as the tractor 13. During such transport, it may be advisable to lower the duct system 16 from its vertical position, shown in Figure 1 in solid lines, to its horizontal position 61 supported by the duct support 62. Upon reaching the location where said apparatus is to be used, the duct system 16 is raised into its vertical position, as by means of the crank and pulley device 63, after which the upper duct 55 is raised by the crank 58 to such position as may be desired or required. It will be observed that the height of the upper end of the upper duct 55 will depend upon that elevation where the warmest air can be found within the reach of said duct system 16. The deflector 52 may be positioned by the adjustment device 53, as desired or required, to effect downward deflection of the air blast of said fan 15.

The source of power, such as the power shaft 43 of the tractor 13, is now actuated, thereby rotating the drive shaft 38, hence the axial flow fan 15. Said fan 15 immediately produces a horizontally directed blast of air through the discharge opening 26 in the fan housing 14. This air is drawn through the duct system 16 from a layer spaced above the ground where, in a typical temperature inversion, the air is sufficiently warm that when it has displaced the cold air lying adjacent the ground, it will prevent injury to the crops.

At the same time, rotation of the drive shaft 38 will be transmitted through the countershaft 44 and the pulley system associated therewith to effect rotation of the shaft housing 33. Due to the particular arrangement of said pulleys in this embodiment, a reduction drive is created whereby said fan housing 14 will be rotated at a substantially lower rotational speed than the axial flow fan 15. By appropriate selection of the upper and lower gear boxes 36 and 39 and the pulleys 45, 46, 48 and 51, the rotational speeds of the axial flow fan 15 and the fan housing 14 may be varied as desired or required.

The rotatability of the fan housing 14 permits the placement of the apparatus 10 in the center of the area where frost prevention is desired. Thus, it is possible to cover a much larger area than possible with stationary types of air heating and air moving equipment.

In one case, for example, an apparatus similar to that disclosed herein and developed for experimental purposes was provided with an eighteen inch propeller fan and a duct system containing approximately six inch pipes, the upper ends of which extended approximately 28 feet above the ground level. The fan housing was utilized in a substantially stationary position, that is, without rotating same about a vertical axis. The warm air blast from said unit was able to protect three acres of cucumbers from frost damage during weather conditions which ruined all similar crops in surrounding areas, some of which areas were on higher ground than the protected area. By using the same equipment, but rotating the fan housing about the vertical axis, the protected area can be increased very substantially, as to ten acres.

After use of the apparatus 10 has been completed, it can be immediately moved to a new location, providing there are no obstructions to the vertically disposed duct system 16 in route. However, if such obstructions do exist, said duct system 16 can be pivoted rearwardly and downwardly into its broken line, horizontal position 61 by means of the crank and pulley device 63.

Although a particular, preferred embodiment of my invention has been disclosed herein for illustrative purposes, it will be understood that variations or modifications within the scope of such disclosure are fully contemplated unless specifically stated to the contrary in the appended claims.

I claim:

1. A portable apparatus for protecting agricultural crops against injury by an inversion-type frost, comprising: a base frame; a circular track on said base frame, with a vertical axis; a curved pipe comprising a fan housing, said housing having a horizontal discharge opening and a top, vertical inlet opening, and having a circular cross-section, which increases gradually from said inlet opening to said discharge opening; support means on said housing extending toward said track; roller means on said support means and engaging said track and supporting said housing for movement on said track; an axial flow fan disposed within said housing adjacent to said discharge opening for rotation about a horizontal axis; drive means connected to said fan for rotating same; means actuated by said drive means for moving said housing on said track about said axis; a pair of telescoping ducts, the outer duct being connected to said housing and communicating with said inlet opening when said ducts are in vertical position; means for moving the inner duct axially of the outer duct; a duct support mounted on said base frame, said duct support being spaced horizontally from, and at about the same level as, the inlet opening, said outer duct being hinged upon said housing for movement between said vertical position and a position against said duct support.

2. A portable apparatus for protecting agricultural crops against injury by an inversion-type frost, comprising: a base frame; a circular track on said base frame, with a vertical axis; a curved pipe comprising a fan housing, said housing having a horizontal discharge opening and a top, vertical inlet opening; an axial flow fan disposed within said housing adjacent to said discharge opening for rotation about a horizontal axis; a drive shaft for said fan extending vertically through said housing coaxial with said vertical axis; a shaft housing surrounding said drive shaft and coaxial with said vertical axis, said shaft housing being fixed to said fan housing and being rotatably supported by said frame and rotatable with respect to said drive shaft; a power source and means connecting said power source to said drive shaft and said shaft housing for separately rotating said drive shaft and said shaft housing; support means on said housing extending toward said track; and roller means on said support means engaging said track and supporting said housing for movement on said track about said vertical axis.

3. The combination of claim 2 wherein said power source is connected to said drive shaft; a counter shaft drivingly connected to said power source; and means drivingly connecting said counter shaft to said shaft housing.

4. A portable apparatus for protecting agricultural crops against injury by an inversion-type frost, comprising: a movable base frame; a circular track on said base frame; a curved pipe comprising a fan housing, said fan housing being positioned above said track and having a horizontal discharge opening and a top, vertical inlet opening; an axial flow fan disposed within said housing adjacent to said discharge opening for rotation about a horizontal axis; a drive shaft for said fan extending vertically through said housing along a vertical axis passing through the center of said circular track; a shaft housing surrounding said drive shaft and coaxial with said vertical axis, said shaft housing being secured to said fan housing and being rotatably supported by said frame and rotatable with respect to said drive shaft; a power source and means connecting said power source to said drive shaft and said shaft housing for separately rotating said drive shaft and said shaft housing; a plurality of support arms secured at spaced intervals to the periphery of said fan housing and extending downwardly and outwardly therefrom toward said track; roller means on said support arms engaging said track and supporting said housing for movement on said track about said vertical axis; and a vertically extending duct secured to said inlet opening.

References Cited in the file of this patent

UNITED STATES PATENTS

| | | |
|---|---|---|
| 1,575,971 | Cobb | Mar. 9, 1926 |
| 1,639,257 | Cobb | Aug. 16, 1927 |
| 2,315,096 | Sanderson | Mar. 30, 1943 |
| 2,551,789 | Copley | May 8, 1951 |
| 2,613,109 | Walker | Oct. 7, 1952 |

FOREIGN PATENTS

| | | |
|---|---|---|
| 156,035 | Australia | Apr. 8, 1954 |
| 664,196 | Great Britain | Jan. 2, 1952 |
| 125,916 | Sweden | Aug. 30, 1949 |